Dec. 11, 1934.  J. M. SHIMER  1,983,780
PISTON
Filed Oct. 20, 1931  2 Sheets-Sheet 1

INVENTOR
John M Shimer
by
Byrnes, Stebbins
Parmelee & Blenko
his attorneys

Dec. 11, 1934.   J. M. SHIMER   1,983,780
PISTON
Filed Oct. 20, 1931   2 Sheets-Sheet 2
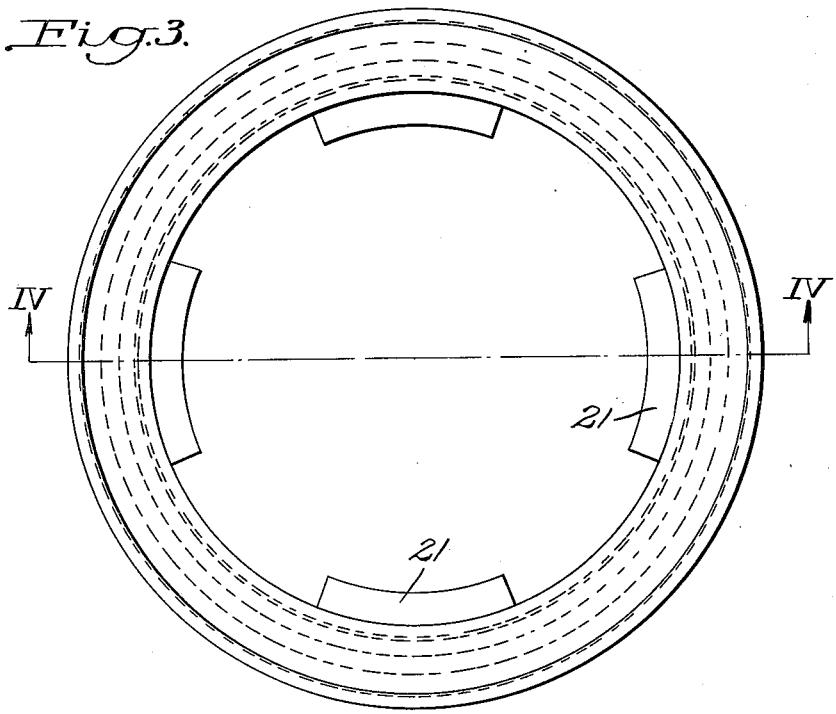
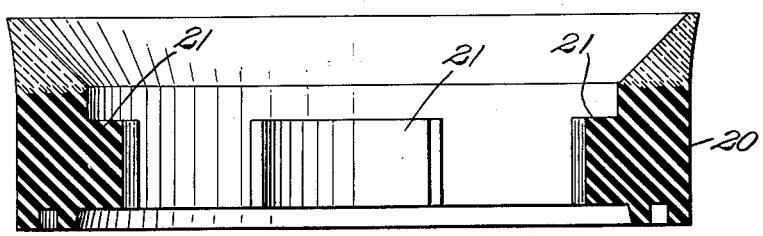
INVENTOR
John M Shimer
by Byrnes, Stebbins, Parmelee & Blenko
his attorneys Patented Dec. 11, 1934

1,983,780

UNITED STATES PATENT OFFICE 1,983,780

PISTON

John M. Shimer, Wilkinsburg, Pa., assignor to Wilson-Snyder Manufacturing Corporation, Braddock, Pa., a corporation of Pennsylvania Application October 20, 1931, Serial No. 569,887

8 Claims. (Cl. 309—31)

The present invention relates to means, such as packing for sealing a piston, which is to be used in a pump for pumping fluids. One object of my invention is to provide a packing or sealing ring which tends to tightly fit the cylinder wall and which is securely mounted on the piston.

A further object of my invention is to provide an improved packing ring which is durable, and which is effective in sealing against the passage of fluid past the piston. Further objects will become apparent during the course of the ensuing description, and will be more particularly pointed out in the accompanying claims.

In the accompanying drawings, I have shown for purposes of illustrating my invention, and not as limiting the same, one embodiment which the same may assume.

Fig. 3 is an end view of one of the piston rings;

Fig. 4 is a sectional view on the line IV—IV of Fig. 3.

Figure 1:
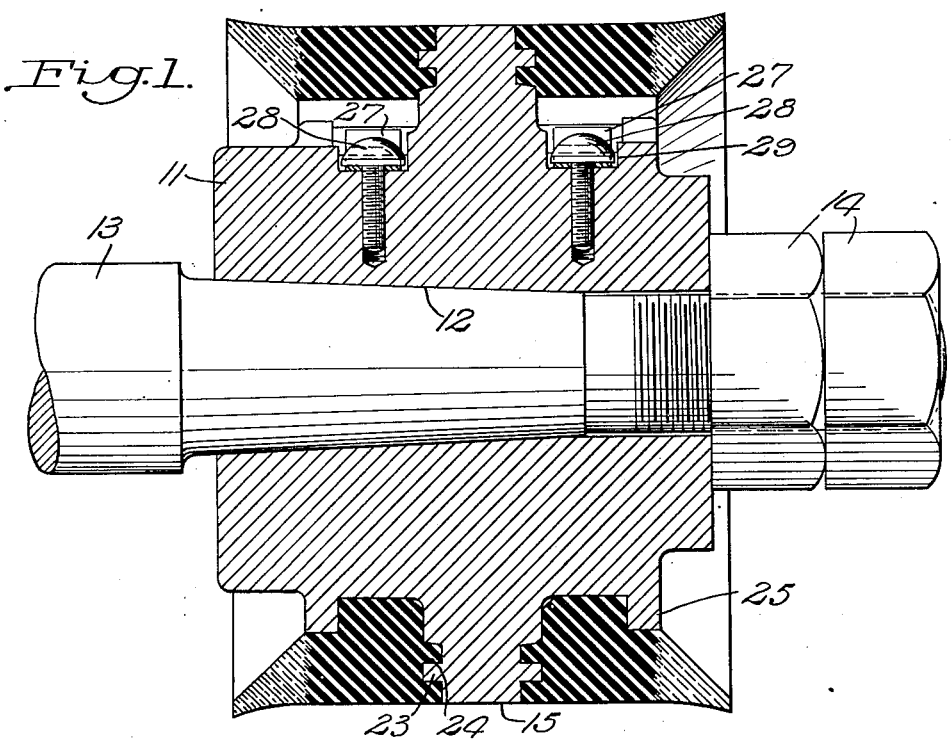
Fig. 1 is a longitudinal sectional view of a piston provided with rings for sealing the piston against leakage along the cylindrical surface of the same.

In the embodiment which I at present prefer, the piston 11 is mounted on the tapering portion 12 of a piston rod 13. A pair of nuts 14 hold the piston on the end of the rod 13. The piston is formed with a cylindrical surface 15 which is adapted to slide in the bore of a cylinder. Adjacent the cylindrical surface 15, the piston is cut away to provide a shoulder against which may abut a packing ring. If a piston is to be used in a single acting pump, but one piston ring and but one shoulder is necessary. In the embodiment illustrated in the drawings, the piston is intended for a double-acting pump, and accordingly the piston is cut away on both sides of the cylindrical surface 15, thus providing opposed shoulders.

Since each of the packing rings is of substantially the same construction, a description of one will suffice for both. As shown in Figs. 3 and 4, the packing ring is of rubber, the body portion 20 of the ring being of hard rubber or composition which does not flex and has rigidity of a high order. This body portion 20 is intended to be mounted on the piston 11; and is provided with a plurality of inwardly projecting portions or lugs 21 for locking the ring to the piston. It is highly desirable to prevent leakage of fluid between the piston and ring; and I, therefore, make the path along which fluid would have to pass circuitous, so as to reduce the chances of leakage to a minimum. The joint between the shoulder of the piston and the ring takes the form herein of a labyrinth. The cross-section of a joint formed in accordance with the principles of my invention might have an S-shaped juncture line; but in the particular embodiment selected for illustration, the juncture is made with sharp corners. The labyrinth might be otherwise described as a tenon and mortise joint which permits a rib 23 on the piston to slide into a groove in the ring, and a rib 24 on the ring to slide into a groove on the piston.

Figure 2:
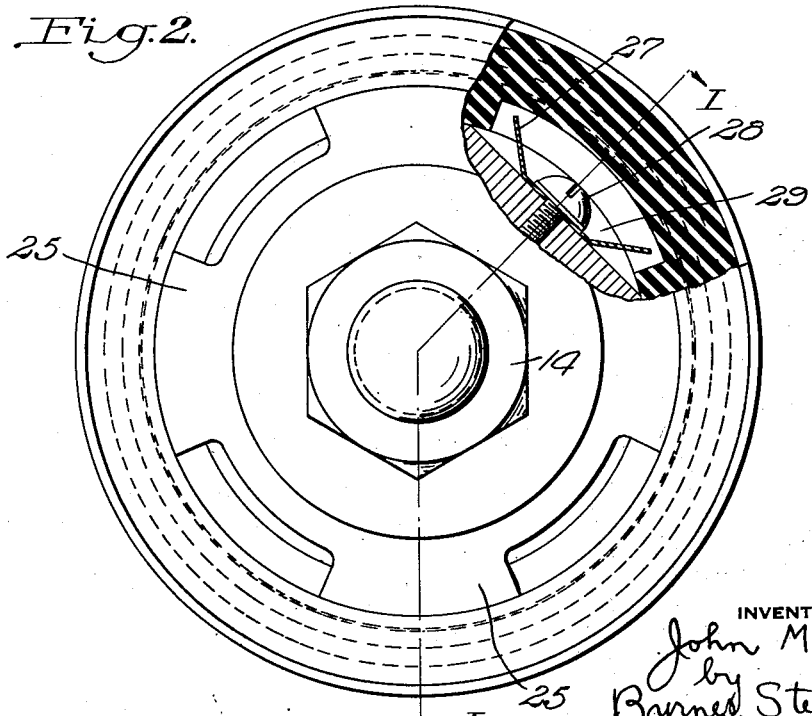
Fig. 2 is an end view taken from the right of Fig. 1 of the piston, a portion of the piston and ring being broken away to illustrate a detail.

As shown more particularly in Fig. 2 of the drawings, the piston 11 is provided with a plurality of projections or lugs 25; and when the ring is assembled with the piston, the lugs 21 on the ring enter between the projections 25 on the piston. At the same time, the portions of the ring and piston, which constitute the labyrinth, interengage. The ring is then rotated so as to bring the lugs 21 behind the projections 25. The ring is now locked to the piston; but in order to prevent separation of the two, it is desirable to prevent such rotation of the ring that the lugs 21 are no longer behind the projections 25. A spring metal detent 27 is fastened by a screw 28 to the piston 11. This detent is principally contained within a recess 29 in the piston; and when the ends of the detent are sprung inwardly, the entire detent is contained within the recess 29. Normally, however, the ends of the detent extend outwardly beyond the recess 29; and spring back to this position if released. The recess 29 is in alinement with the lugs 21 when the ring is in operative position on the piston, as is evident from Fig. 1. During the assembling of the ring with the piston, a lug 21 is forced over the detent 27, thus flexing the ends inwardly. When the ring is rotated to bring the lugs 21 behind the projections 25, the ends of the detent are released and sprung into the opening between two lugs 21, as is evident in Fig. 2. The detent is thus operative to prevent such rotation of the ring as will permit the same to become loosened from the piston.

It is desirable that a portion of the ring be elastic and flexible enough to yieldably engage the walls of the cylinder within which the piston 11 is to reciprocate. The ring might be made in two portions, one of which is stiff and hard, and the other of which is flexible to act as the sealing portion of the ring. I find it advantageous to form the ring as an integral member; and by making the ring of rubber and vulcanizing the body portion harder than the sealing portion, I am able to provide a ring which is durable and is yet highly efficient in sealing against leakage past the piston.

I prefer to taper the sealing portion of the ring, as indicated in Fig. 4 of the drawings. When this tapered portion is the leading edge of the piston, the fluid pressure in that end of the cylinder has an outwardly directed component which forces this leading edge into sealing engagement with the walls of the cylinder.

I have discovered that while this tapering of the leading edge is desirable, it is not sufficient to ensure against leakage; and I have furthermore discovered that if, before insertion in the cylinder, the leading edge of the ring is oversize so that its periphery must be made smaller before it can be gotten into the cylinder, effective sealing is accomplished. Due to the soft rubber portion of the ring being oversize, this portion is crowded into engagement with the walls of the cylinder. During the compression stroke, the bevel assists the crowding action of the leading edge in effecting sealing. During the suction stroke, there is a tendency for the beveled portion of the ring to suck away from the cylinder walls. I have discovered that by making the flexible portion of the ring oversize, as indicated in Figs. 1 and 4, this portion is crowded against the cylinder walls so that they are not drawn away from these walls even during the suction stroke.

By making the ring non-uniform, the hard rubber portion resists wear and tear, and the life of the ring is extended. This improvement, in durability, does not interfere with the efficiency of the ring in sealing. In fact, by making the flexible portion oversize, I have much improved the sealing efficiency of the ring.

While I have specifically illustrated and described the preferred embodiment of my improved piston and packing ring, it is to be understood that the invention is not so limited, but may be otherwise embodied and practiced within the scope of the following claims.

I claim:

1. A pump piston comprising a body comprised of substantially non-flexing material having a laterally projecting circumferential collar thereon and a detachable packing ring comprised in part of non-flexing material and in part of flexing material surrounding the body, said collar and the non-flexing portion of the ring having interengaging mortise and tenon portions to form an annular labyrinth sealing the junction between the collar and the ring.

2. A pump piston comprising a body comprised of substantially non-flexing material having a laterally projecting circumferential collar thereon and a detachable packing ring comprised in part of non-flexing material and in part of flexing material surrounding the body, said collar and the non-flexing portion of the ring having interengaging ribs and grooves to form an annular labyrinth sealing the junction between the collar and the ring.

3. In combination, a piston having a cylindrical surface for sliding in the bore of a cylinder and an annular shoulder at one end of said cylindrical surface, and a detachable packing ring comprised in part of non-flexing material and in part of flexing material disposed on said piston against the said shoulder, the non-flexing portion of said ring forming a continuation of the cylindrical surface of the piston, the abutting surfaces of said ring and piston carrying tenon and mortise joints forming an annular labyrinth sealing the junction therebetween.

4. In combination, a piston having a cylindrical surface for sliding in the bore of a cylinder, an annular shoulder at one end of said cylindrical surface, a plurality of projections spaced from the shoulder, and a detachable packing ring comprised in part of non-flexing material and in part of flexing material disposed on the said piston against the said shoulder, the non-flexing portion of said ring having inwardly projecting portions for interlocking with the projections of the shoulder by relative rotary movement between the piston and ring, and the said shoulder and the non-flexing portion of the ring having interengaging portions to form an annular labyrinth sealing the junction between the shoulder and ring.

5. In combination, a piston, a packing ring, said piston and packing ring being provided with means for interlocking the same by relative rotary movement, and a yieldable leaf spring member carried by the piston for holding the packing ring in interlocked position.

6. In combination, a piston having recesses, a continuous packing ring having projections receivable in said recesses by relative rotary movement between the piston and ring, and a yieldable leaf spring member carried by the piston for holding the ring against rotation to releasing position.

7. In combination, a piston having a plurality of projections, a packing ring having inwardly extending lugs for interlocking with the projections by relative rotary movement between the piston and ring, and a yieldable leaf spring member carried by the piston for engaging a lug of the ring when the ring is in interlocked position.

8. In combination, a piston having a plurality of projections, a packing ring comprised of rubber formed with a body portion of relatively non-flexing rubber having inwardly extending lugs for interlocking with the projections by relative rotary movement between the piston and ring and an annular flange portion integral with the body portion comprised of relatively flexible rubber adapted to laterally extend beyond the peripheral surface of the body portion, and a leaf spring member carried by the piston in position to engage in the space between lugs on the ring when the ring is in interlocked position.

JOHN M. SHIMER.